(12) United States Patent
Karaaslan (10) Patent No.: US 11,047,526 B2
(45) Date of Patent: Jun. 29, 2021

(54) MOUNTING BRACKET

(71) Applicant: Bahri Karaaslan, Carlstadt, NJ (US)

(72) Inventor: Bahri Karaaslan, Carlstadt, NJ (US)

( * ) Notice: Subject to any disclaimer, the term of this patent is extended or adjusted under 35 U.S.C. 154(b) by 0 days.

(21) Appl. No.: 16/752,349

(22) Filed: Jan. 24, 2020

(65) Prior Publication Data

US 2020/0240581 A1 Jul. 30, 2020

Related U.S. Application Data

(60) Provisional application No. 62/796,371, filed on Jan. 24, 2019.

(51) Int. Cl.
*A47F 7/14* (2006.01)
*F16M 13/02* (2006.01)
*F16B 35/00* (2006.01)

(52) U.S. Cl.
CPC ........... *F16M 13/02* (2013.01); *F16B 35/005* (2013.01)

(58) Field of Classification Search
CPC ........ A47G 1/162; A47G 1/1604; A47G 1/16; F16M 13/02; F16M 13/00; F16B 35/005
See application file for complete search history.

(56) References Cited

U.S. PATENT DOCUMENTS

| | | | | | |
|---|---|---|---|---|---|
| 2,263,901 | A | * | 11/1941 | Olney | A47G 1/162 248/496 |
| 3,211,409 | A | * | 10/1965 | Zimmermann | A47G 25/0635 248/551 |
| 4,557,457 | A | * | 12/1985 | Cockfield | A47G 1/162 248/220.1 |
| 4,932,146 | A | * | 6/1990 | Long | A47G 1/1666 40/759 |
| 6,299,123 | B1 | * | 10/2001 | Hayde | A47B 95/008 248/476 |
| 7,497,028 | B2 | * | 3/2009 | Nevers | A47G 1/1606 33/613 |
| 2011/0017888 | A1 | * | 1/2011 | Sangiuliano | F16M 11/04 248/222.14 |

* cited by examiner

*Primary Examiner* — Amy J. Sterling
(74) *Attorney, Agent, or Firm* — Stephen Presutti; Kevin Keener (57) ABSTRACT

A bracket for hanging an item on a wall is disclosed. The bracket has one or more bracket apertures which are used to mount the bracket to the hanging item. The hanging item could be an item like a picture or a shelf. The bracket has a mounting aperture which is used to mount the hanging item on a nail or a screw. Adjacent to the mounting aperture is a pinhole having a set screw. To use the bracket the user unthreads the set screw from the pinhole opening. The user places the hanging item in its desired location on the wall and pushes the item against the wall so that the set screw marks a spot on the wall where the user should place a nail or a screw for hanging the item.

1 Claim, 8 Drawing Sheets

MOUNTING BRACKET

PRIORITY

This application claims priority to U.S. Provisional Patent Applicant Ser. No. 62/796,371, filed on Jan. 24, 2019, the disclosure of which is hereby fully incorporated by reference.

FIELD OF THE INVENTION

The present disclosure relates generally to wall mounting units, and more particularly, to functional brackets that may be used to self-mark the mounting location.

BACKGROUND OF INVENTION

Brackets are utilized to mount shelving, pictures, and decorative items on walls. Brackets can be embedded in these items or utilized separately. Brackets provide a benefit for wall mounting as the use of brackets provides stability and security to these items and prevents these items from falling and breaking or injuring individuals.

The process of hanging items with brackets can be tedious. In some instances the individual utilizes a paper template to mark locations on a wall for securing screws or nails. These templates are limited in that the template may be damaged or lost. Additionally, templates are primarily meant for a single use. If an individual decides to later move the wall mounted unit, the template is not available for a second use. If a template is not utilized the individual must measure the distance between brackets, estimate the location of the bracket on the location on the wall when the item is hung, and attempt to secure screws and nails imprecisely. These methods are severely limited and are not efficient enough to allow individuals to hang wall mounted objects without issue. What is needed is a novel bracket and method for hanging which removes these deficiencies and improves the ease and efficiency of hanging wall mounted units.

The invention relates to bracketing features which improve the ease and efficiency of hanging wall mounted items. Particularly, this bracketing device allows for quick installation of shelfs, frames, tapestries, baskets, blankets, hooks, plates, carpets, mirrors, plants, pictures, books, crates, calendars, lights, murals, artwork, boards and other items.

Each bracket is manufactured with a screw, pin, nail, anchor, clip, clamp, hook, bolt, or nut in a unique position depending on the item to be mounted. This feature is pre-attached to the bracket and extends or can be extended slightly from the bracket. The bracket is then pre-installed by the manufacturer to the desired item. With an application of some force the extending mounting feature will mark the desired mounting location. The user can then drill or perforate the marked location and easily mount the item without any added effort or measurements.

This type of bracket will save individuals time from needing to measure the mounting location and drilling properly placed holes that closely match the bracket location. It ensures that the bracket will sit correctly at the mounting location and anchor the desired item to the mounting location properly.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed to a bracket for hanging an item comprising one or more bracket apertures; a mounting aperture; a pinhole opening disposed adjacent to said mounting aperture; and wherein said bracket has a longitudinal axis, wherein said longitudinal axis passes through a diameter of said pinhole opening.

The bracket may further comprise a set screw having a threading disposed in said pinhole opening. Alternatively, the bracket may further comprise a marking element disposed in said pinhole opening.

The mounting aperture may have a first end and a second end, wherein said first end of said mounting aperture has a first width, wherein said second end of said mounting aperture has a second width, wherein said first width is greater than said second width, wherein said second end of said mounting aperture is disposed adjacent to said pinhole opening.

In another embodiment said one or more bracket apertures further comprise a first bracket aperture having a first aperture diameter and a second bracket aperture having a second aperture diameter; wherein said longitudinal axis passes through said first aperture diameter; and wherein said longitudinal axis passes through said second aperture diameter.

In another embodiment said one or more bracket apertures further comprise a first bracket aperture having a first aperture diameter and a second bracket aperture having a second aperture diameter; wherein said longitudinal axis does not pass through said first aperture diameter; and wherein said longitudinal axis passes does not pass through said second aperture diameter.

In another embodiment the bracket further comprises a hanging member; an attachment member; wherein said hanging member is pivotably connected to said attachment member; wherein said pinhole opening is disposed at an end of said attachment member opposite from said attachment member.

The invention is directed toward a method for hanging an item on a wall comprising unthreading said set screw from said pinhole opening so that a portion of said set screw extends laterally from said bracket and away from said item; holding said item in a desired position against a wall; pressing said item against said wall so that said portion of said set screw creates an impression in said wall; inserting a hanging fastener into said impression in said wall; and placing said hanging fastener within said mounting aperture. A hanging fastener is any item placed in a wall which the item may hang from, such as a nail or a screw. The method may further comprise threading said set screw into said pinhole opening after creating said impression in said wall until said set screw does not extend laterally from said bracket.

The invention is already directed toward a method for hanging an item on a wall comprising attaching a bracket to a back side of said item; holding said item in a desired position against a wall; pressing said item against said wall so that a portion of said marking element creates a visual mark on said wall; applying a mark on a hanging location on said wall with said marking element; inserting a hanging fastener in said wall where said mark is located; and placing said hanging fastener within said mounting aperture. The method may further comprise removing said marking element from said pinhole opening prior to hanging said item on said hanging fastener.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

Figure 1:
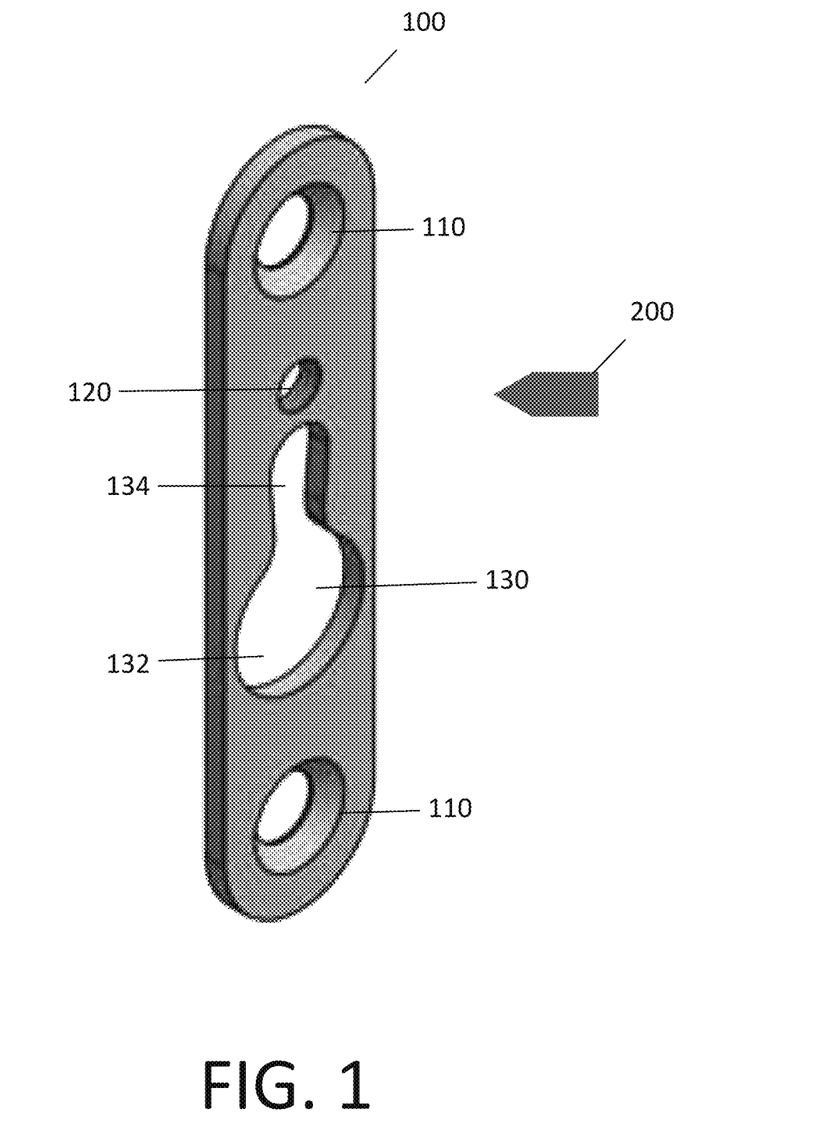
FIG. 1 is a perspective view of the bracket.
Figure 2:
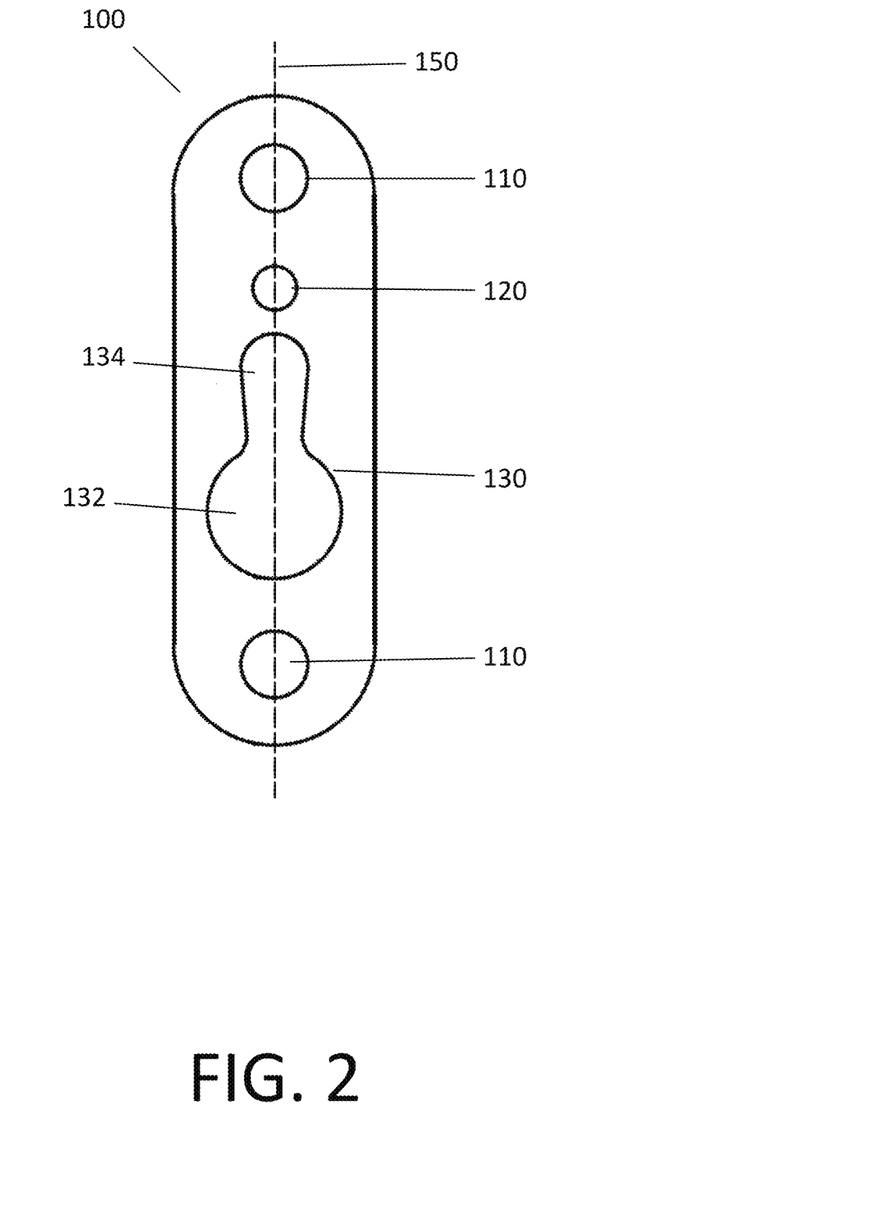
FIG. 2 is a plan view thereof.

Referring to FIG. 1 and FIG. 2, the preferred embodiment of the invention is illustrated. The basis of the invention is a bracket 100 that is designed to allow efficient marking for holes on walls for the hanging of shelving, pictures, or wall décor. The bracket 100 may be preinstalled on an item for hanging or may be separate. If separate, the user must install the bracket on the item that is desired to be hung on a wall. As shown in FIGS. 1 and 2, the bracket comprises bracket apertures 110, a pinhole opening 120, and a mounting aperture 130. The bracket 100 has a longitudinal axis 150, which runs along the length of the bracket 100 and bifurcates the bracket into equal halves.

There may be any number of bracket apertures 110. The bracket apertures 110 are used to install the bracket directly to the item desired to be mounted. The bracket apertures 110 may be any size and shape. In the preferred embodiment the bracket apertures 110 are circular openings with a beveled edge, allowing any screws holding the bracket 100 to the mounted item to be countersunk or flush with the surface of the bracket 100.

The pinhole opening 120 may be any size and shape. In the preferred embodiment the pinhole opening 120 is a threaded circular opening. In other embodiments the pinhole opening is a smooth opening. In the preferred embodiment the pinhole opening 120 is configured to receive a set screw 200. The set screw 200 may be any size and shape.

The mounting aperture 130 may be any size and shape. In the preferred embodiment the mounting aperture 130 has a bottom end 132 and a top end 134. The bottom end 132 has a greater width than the width of the top end 134. In this embodiment, when hanging an item, the user places a screw head through the bottom end 132 of the mounting aperture 130. The screw head then slides into the top end 134 of the mounting aperture 130 when the item is hung. The top end 134 of the mounting aperture 130 rests on the screw while the item is hanging on a wall. The narrower width of the top end 134 prevents the head of the screw from moving through the mounting aperture 130. In other embodiments the mounting aperture 130 may be other shapes, such as a circle or oval. Regardless of the shape, the top of the mounting aperture 130 rests on the screw or nail embedded in the wall while the item is hanging.

In the preferred embodiment of the bracket 100, the pinhole opening 120 is in alignment with the longitudinal axis 150 of the bracket 100. Ideally, the longitudinal axis 150 passes through the diameter of the pinhole opening 120. Additionally, in the preferred embodiment, the longitudinal axis 150 passes through the center of the mounting aperture 130 and bifurcate the mounting aperture 130 into two equal halves. In this manner the bracket will hang on a screw in its center of gravity and the longitudinal axis 150 will be plum with the ground while the item is hanging.

Figure 3:
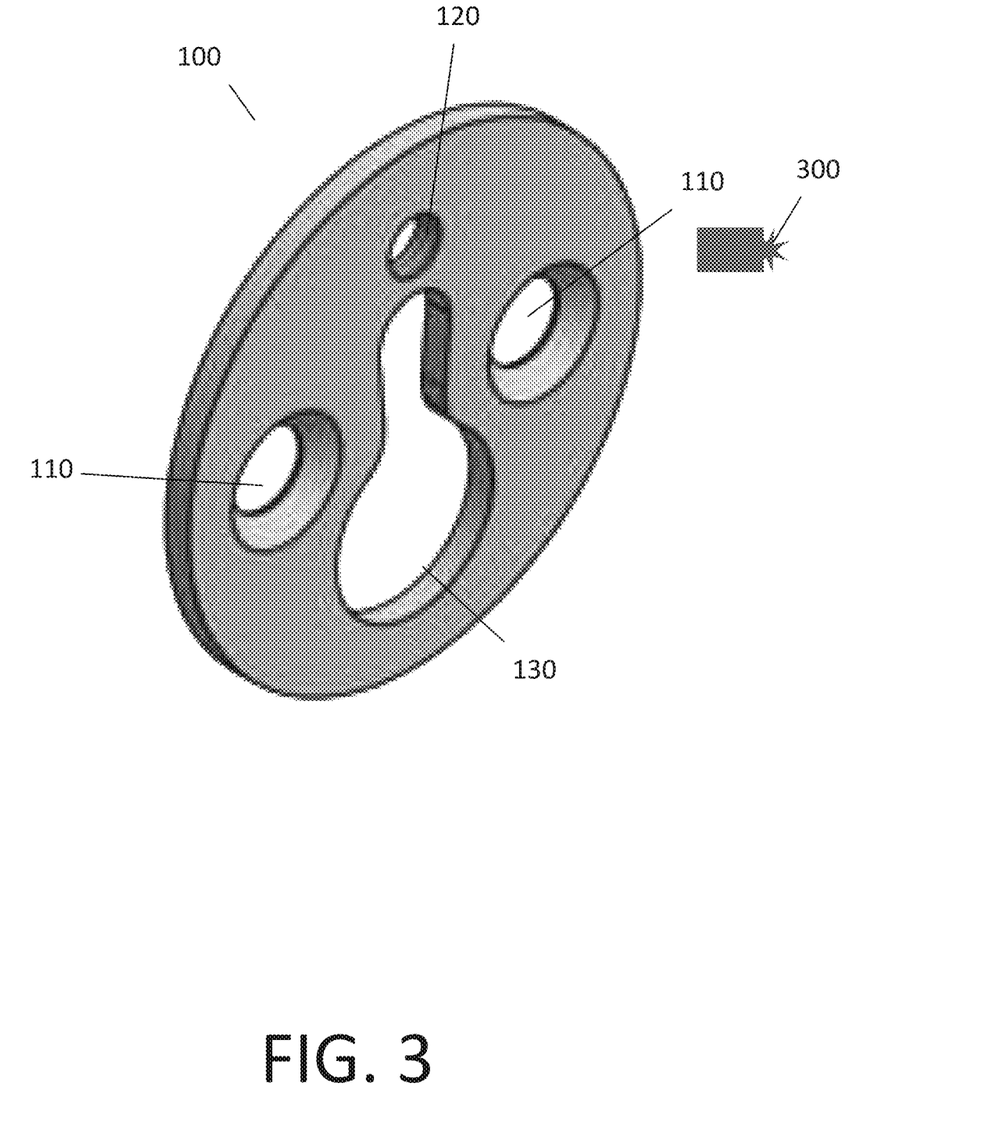
FIG. 3 is a perspective view of another embodiment of the bracket.
Figure 4:
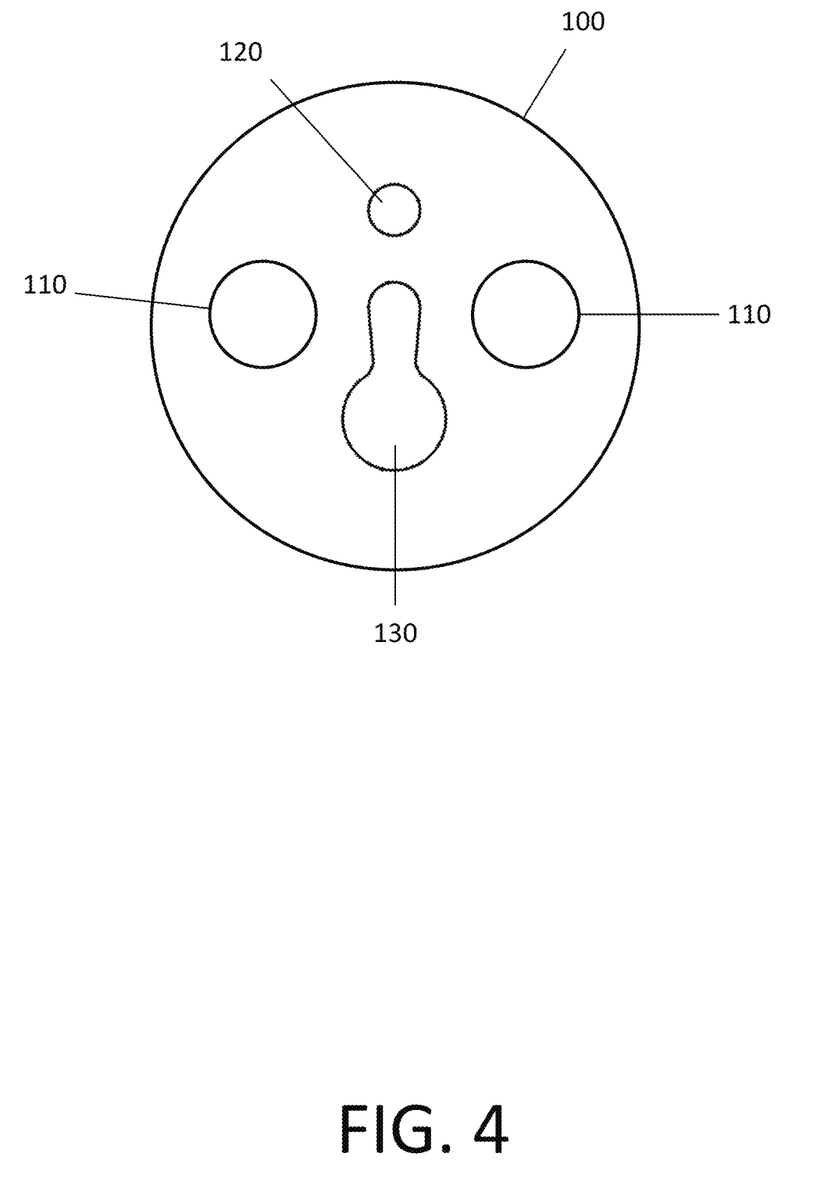
FIG. 4 is a plan view thereof.

Referring to FIGS. 3 and 4, another embodiment of the bracket is illustrated. In this embodiment the bracket apertures 110 are out of line with the longitudinal axis 150 of the bracket 100. However, the pinhole opening 120 and mounting aperture 130 are still aligned with the longitudinal axis 150 of the bracket 100. In addition, in the embodiment shown, the bracket 100 may have a marking element 300. The marking element 300 may be any type of item that is used to create a visual mark, such as a pencil, pen, marker, or any other instrument. Additionally, the marking element 300 may be a member that does not contain its own media but requires media to be applied to create a mark, such as a paint brush. The marking element 300 can be set into the pinhole opening 120 so that the end that creates a mark is facing outward away from the bracket 100.

Figure 5:
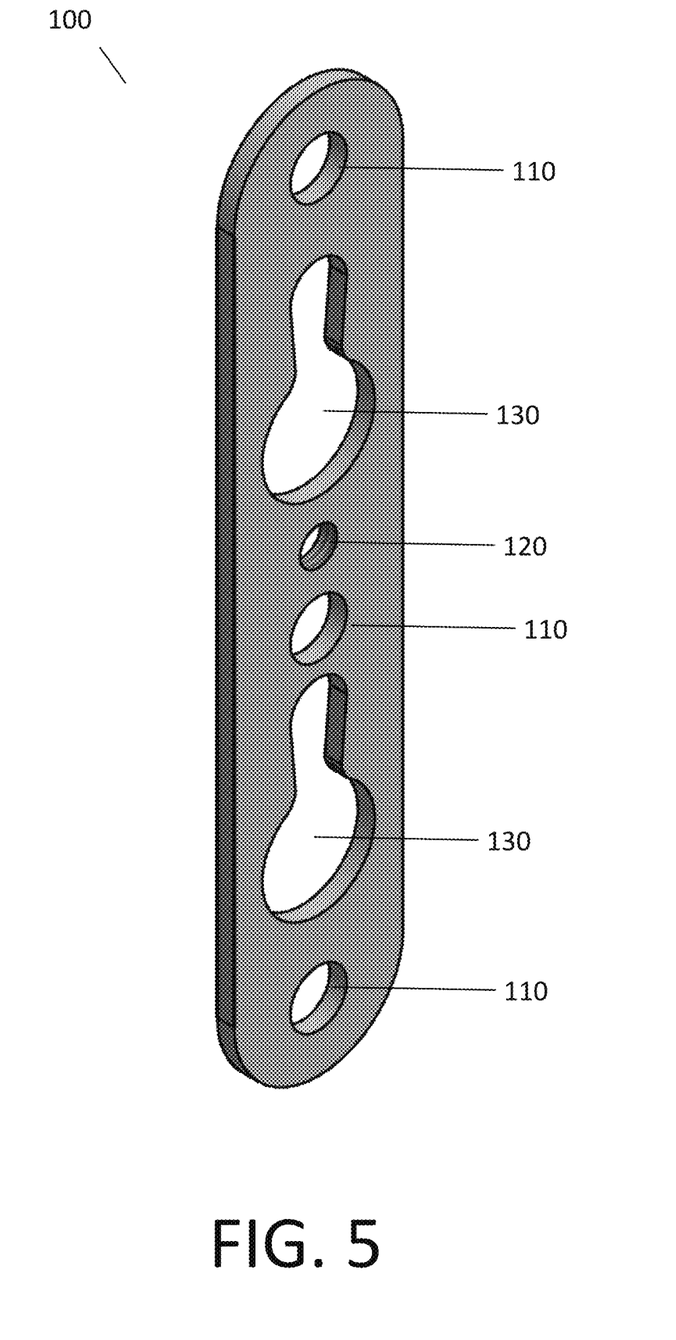
FIG. 5 is a perspective view of another embodiment of the bracket.
Figure 6:
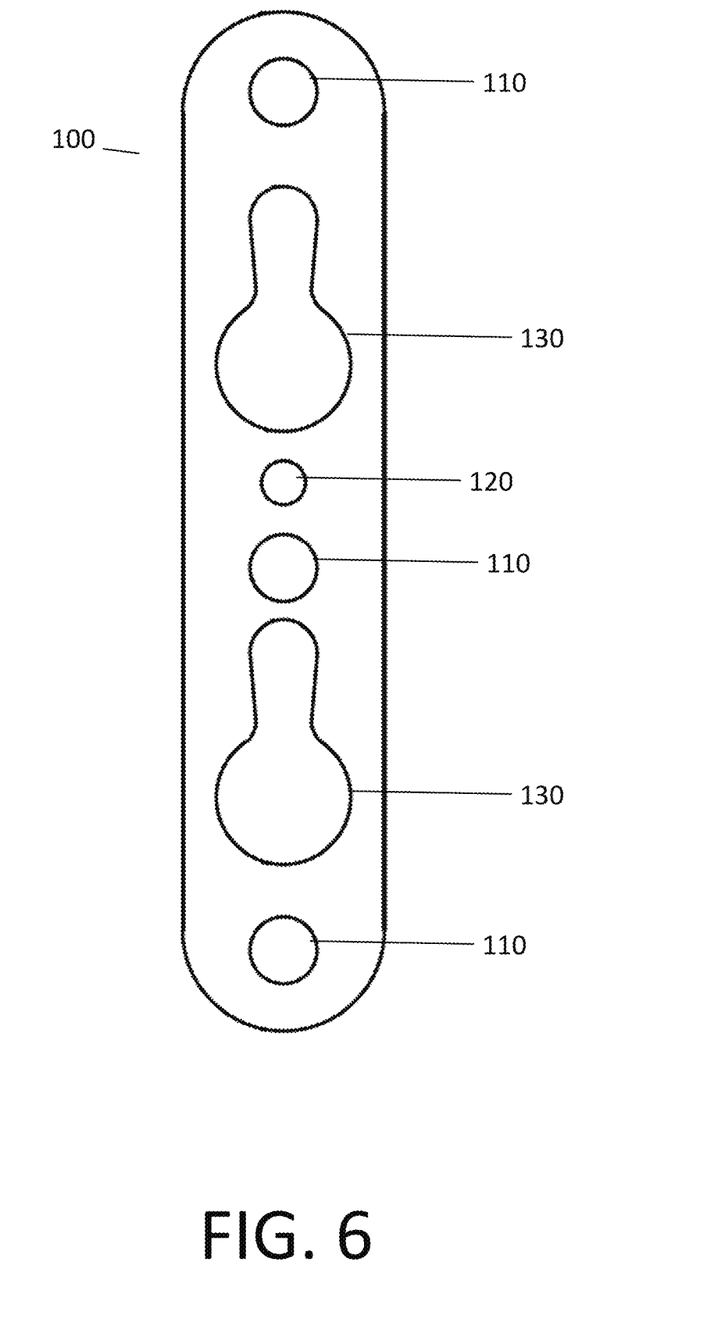
FIG. 6 is a plan view thereof.

Referring to FIG. 5 and FIG. 6, another embodiment of the invention is illustrated. In this embodiment there are three bracket apertures 110 and two mounting apertures 130. In the embodiment illustrated there is a single pinhole opening 120 but there may be multiple pinhole openings 120.

Figure 7:
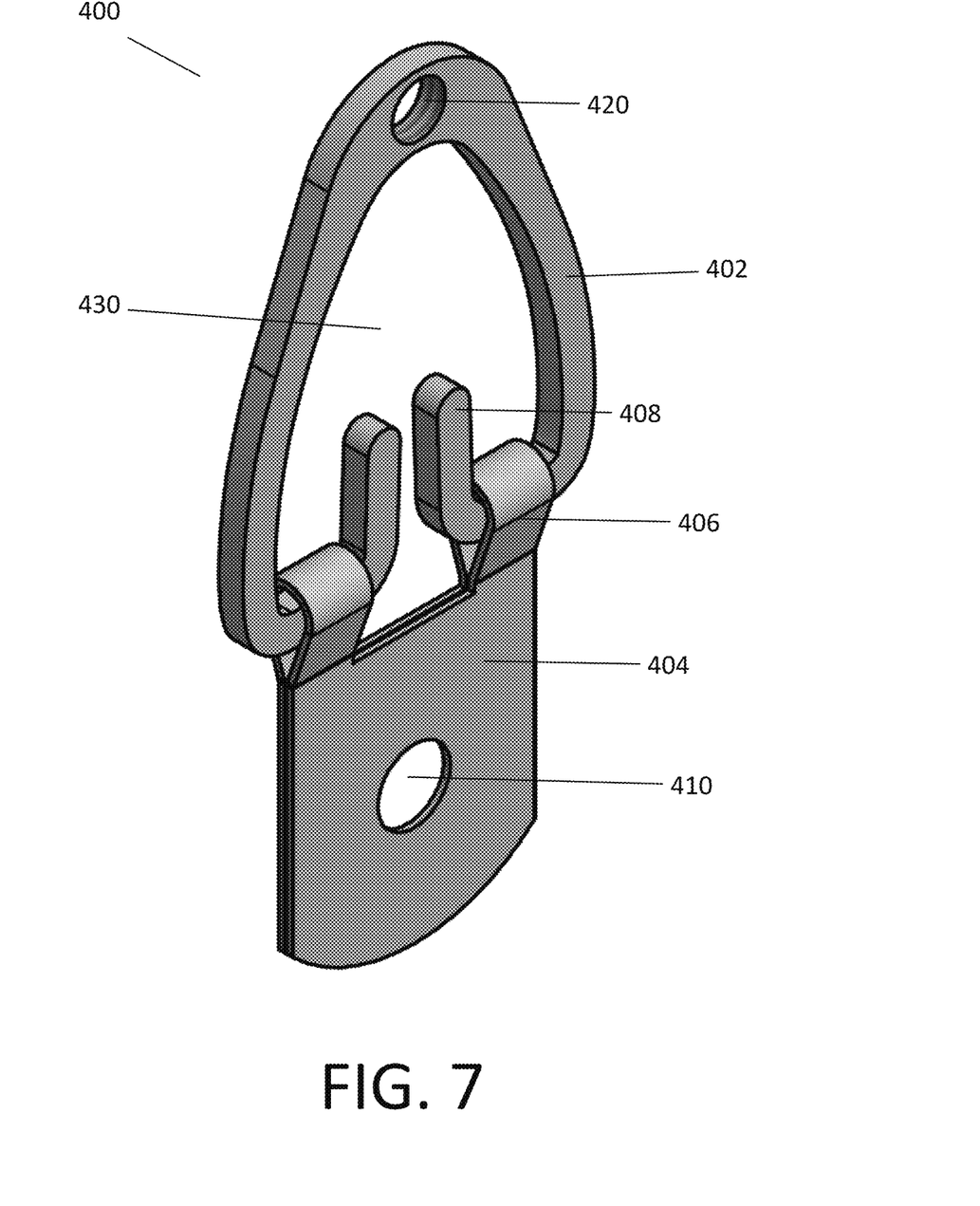
FIG. 7 is a perspective view of another embodiment of the bracket.
Figure 8:
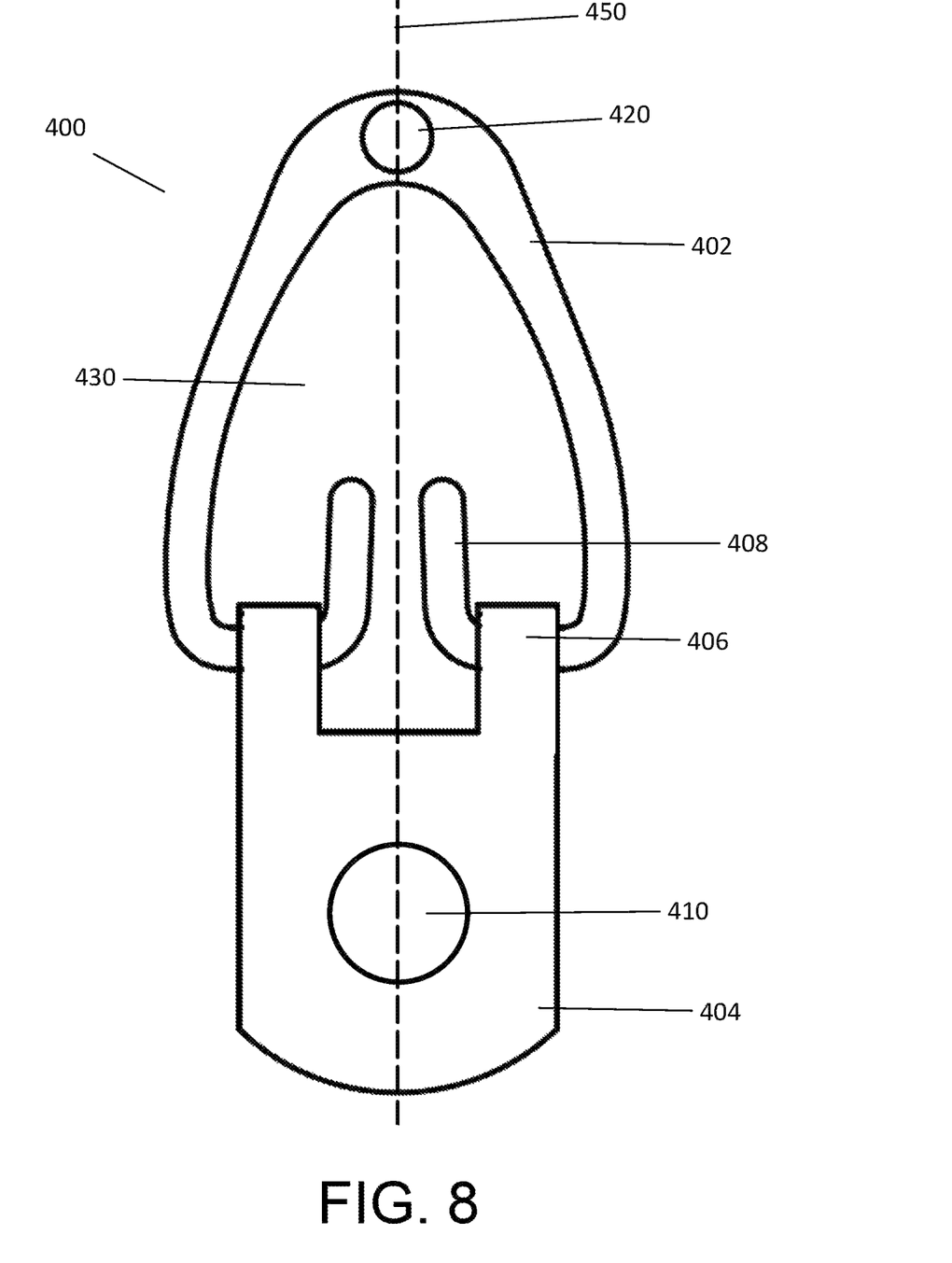
FIG. 8 is a plan view thereof.

Referring to FIG. 7 and FIG. 8, another embodiment of the invention is illustrated. In this embodiment the bracket 400 is comprised of a hanging member 402 and an attachment member 404. The hanging member 402 is utilized to hang on a screw or nail in the wall. The attachment member 404 is utilized to attach to the item being hung on the wall. The hanging member 402 and attachment member 404 are pivotably connected together. The attachment member 404 may be any size and shape. The hanging member 402 may be any size and shape. There may be a single hanging member 402 or multiple hanging members 402 connected to a single attachment member 404. There may be a single attachment member 404 or multiple attachment members 404 connected to a single hanging member 402.

The attachment member 404 has one or more rings 406. The rings 406 are positioned at the top end of the attachment member 404. The rings 406 are circular members with an interior space for receiving a portion of the hanging member 402. The bottom end of the hanging member has one or more hooks 408. The hooks 408 are utilized to pass through the rings 406. In other embodiments the rings 406 are attached to the hanging member 402 and the hooks 408 are attached to the attachment member 404. In other embodiments the rings 406 and hooks 408 are replaced by any other item which permits the hanging member 402 to be rotably connected to the attachment member 404. In other embodiments, the hanging member 402 and attachment member 404 are connected by a swivel or a hinge.

As illustrated the attachment member 404 has a bracket aperture 410 which permits the bracket 400 to be attached to the item being hung. The bracket aperture 410 may be any size and shape. There may be any number of bracket apertures 410. In some embodiments the bracket aperture 410 may have a bevel to permit a screw to be countersunk or flush with the attachment member 404. The hanging member 402 has a hanging space 430 which is defined by the hanging member 402. The hanging space 430 is the space where a screw or nail in a wall is disposed through while the item is hung on the wall.

In the preferred embodiment the hanging member 402 is "V" shaped where the top of the hanging member 402 is narrower than the bottom end of the hanging member 402. This ensures that the nail or screw in a wall is disposed the top end of the hanging space 430. Disposed at the top end of the hanging member 402 is a pinhole opening 420. The bracket 420 has a longitudinal axis 450 that passes through the center of the bracket 400 and bifurcates the bracket 400. In the preferred embodiment the longitudinal axis 450 passes through the diameter of the pinhole opening 420 and bracket aperture 410. The longitudinal axis 450 also passes through the top end of the hanging space 430. The pinhole opening 420 may utilize a set screw 200 or a marking element 300.

Other embodiments of the invention are possible without departing from the scope of the invention. Depending on the desired mounted object the pinhole opening 120 can house various types of bolts, nuts, screws, pins or nails. The pinhole opening 120 may house an item that will be used to easily mark the desired mounting location. Whatever is housed in the pinhole opening 120 will slightly protrude from the opening and bracket.

In the preferred embodiment, as shown in the drawings, the pinhole opening may utilize a Ray-Allen screw which slightly protrudes from the bracket. The mounting aperture 130 will rest upon a nail, screw, clip, or bolt and anchor the mounted item at the desired mounted location on a wall. This is in order to ensure that after the screw, nut, or bolt in the pinhole opening has been used to mark the mounting location, the bracket will rest properly.

After using the screw, nut, or bolt housed in the pinhole opening 120 to mark the desired location and perforating the marked location the desired item to be mounted can easily be placed and mounted. Because of the location of the pinhole opening 120 and ease of marking the location the installation and mounting of items becomes significantly easier. The risk of improperly measuring and installing nails or screws to mount items is eliminated.

Depending on the objects desired to be mounted, brackets can take different forms. The bracketing apertures, pinhole opening, and housing cavity are not restricted to any specific location, but may vary depending on need and design of the desired item to be mounted.

To utilize the invention as illustrated, the user first obtains the item the user desires to mount on the wall. The user attaches one or more brackets 100 to the item. Alternatively, the item may have one or more brackets 100 already installed on the item. The user partially unthreads the set screw 200 from the pinhole 120 so that the set screw 200 protrudes laterally from the bracket 100. The user positions the item at the desired location on the wall for mounting. The user presses the item against the wall. In doing so the set screw 200 is pushed into the wall. In this embodiment, the wall is preferably made of gypsum or drywall. The wall may also be wood or paneling as well. By pushing the set screw 200 into the wall the user has created a mounting location for securing a screw or nail. The set screw 2000 creates an impression or indentation into the wall. The user then secures a mounting screw or nail into the wall at the marked location. The user then threads the set screw 200 into the bracket 100 so that it is flush or fully removes the set screw. The user may then insert the mounting screw or nail into the mounting aperture 130 and hang the item on the wall.

There are many alternative embodiments available for the invention without deviation from the inventive nature of the bracket. Any type of protruding item may be utilized on the bracket. The bracket may come with removable protrusions with ink or other marking items, such as a pen or pencil which is mounted in the pinhole opening. In this manner the user does not create an impression in the wall but instead creates a visual mark in the wall at the desired location. The user then removes the marking item from the pinhole opening 120 before hanging the item. In other embodiments the set screw 200 may instead be replaced by a pin with a spring which allows the pin to be retractable by pressing on the pin. The pin may than create an impression in the wall during use. In other embodiments the user may apply ink or charcoal to the tip of the pin to create a visual mark on the wall at the desired location. In other embodiments the pin or screw extending from the bracket creates a pilot hole for inserting the mounting screw or nail.

The bracket 100 may take any shape and retain its function. The components of the bracket 100 may take any shape and retain their function. The primary invention is a removable or retractable component on the bracket which creates an impression or visual mark for the location of placing a mounting screw or nail in the wall.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit of this invention.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A bracket for hanging an item comprising
   a) one or more bracket apertures;
   b) a mounting aperture;

c) a pinhole opening disposed adjacent to said mounting aperture;
d) wherein said bracket has a longitudinal axis, wherein said longitudinal axis passes through a diameter of said pinhole opening;
e) wherein said one or more bracket apertures further comprise a first bracket aperture having a first aperture diameter and a second bracket aperture having a second aperture diameter;
f) wherein said longitudinal axis passes through said first aperture diameter;
g) wherein said longitudinal axis passes through said second aperture diameter;
h) a set screw having a threading;
i) wherein said set screw is disposed in said pinhole opening;
wherein said mounting aperture has a first end and a second end, wherein said first end of said mounting aperture has a first width, wherein said second end of said mounting aperture has a second width, wherein said first width is greater than said second width, wherein said second end of said mounting aperture is disposed adjacent to said pinhole opening.

\* \* \* \* \*